United States Patent
Neville et al.

(10) Patent No.: US 10,226,746 B2
(45) Date of Patent: Mar. 12, 2019

(54) REMOVABLE NOZZLE ASSEMBLY AND GAS TRANSFER SYSTEM

(71) Applicant: KLa Systems, Inc., Assonet, MA (US)

(72) Inventors: Mark Neville, Mashpee, MA (US); Frederick Siino, Providence, RI (US); Jeffrey Williamson, New Berlin, WI (US)

(73) Assignee: KLa Systems, Inc., Assonet, MA (US)

( * ) Notice: Subject to any disclaimer, the term of this patent is extended or adjusted under 35 U.S.C. 154(b) by 280 days.

(21) Appl. No.: 15/179,787

(22) Filed: Jun. 10, 2016

(65) Prior Publication Data

US 2017/0015573 A1    Jan. 19, 2017

Related U.S. Application Data

(60) Provisional application No. 62/192,904, filed on Jul. 15, 2015.

(51) Int. Cl.
| | |
|---|---|
| *B01F 3/04* | (2006.01) |
| *B01F 15/00* | (2006.01) |
| *B01F 5/04* | (2006.01) |
| *C02F 3/20* | (2006.01) |
| *B01F 5/10* | (2006.01) |

(52) U.S. Cl.
CPC ...... *B01F 15/00922* (2013.01); *B01F 3/0451* (2013.01); *B01F 5/043* (2013.01); *B01F 5/0421* (2013.01); *B01F 5/106* (2013.01); *C02F 3/20* (2013.01); *C02F 2203/006* (2013.01); *Y02W 10/15* (2015.05)

(58) Field of Classification Search
CPC ...... B01F 3/0451; B01F 5/0421; B01F 5/043; B01F 5/106; B01F 15/00922; C02F 3/20; C02F 2203/006; Y02W 10/15
USPC ........................................ 261/76, 121.1, 124
See application file for complete search history.

(56) References Cited

U.S. PATENT DOCUMENTS

| | | | | |
|---|---|---|---|---|
| 3,876,541 | A * | 4/1975 | Anderson | B01F 3/04241 |
| | | | | 210/150 |
| 4,098,851 | A | 7/1978 | Schulte et al. | |
| 4,139,579 | A * | 2/1979 | Blum | B01F 3/0446 |
| | | | | 210/219 |
| 4,162,970 | A | 7/1979 | Zlokarnik | |
| 4,162,971 | A | 7/1979 | Elgeti et al. | |
| 4,210,534 | A * | 7/1980 | Molvar | B01F 3/0446 |
| | | | | 210/220 |
| 4,264,039 | A * | 4/1981 | Moreland | A61H 33/027 |
| | | | | 137/888 |

(Continued)

OTHER PUBLICATIONS

KLa Systems Slot Injector Aerator Brochure, Apr. 22, 2013.
KLa Systems Jet Aeration Systems Brochure, Apr. 22, 2013.
KLa Systems Technology Guide, Nov. 12, 2008.

*Primary Examiner* — Charles S Bushey
(74) *Attorney, Agent, or Firm* — Neal, Gerber & Eisenberg LLP (57) ABSTRACT

The present technology relates to a gas transfer system having removable nozzle assemblies, ejectors or other gas transfer device(s). The nozzle assemblies are removably connected to a monolithic liquid/gas manifold. The present technology also provides nozzle assemblies having an inner nozzle, an outer nozzle adapted for connection to the inner nozzle, and a pipe adapter for connecting the inner nozzle to a liquid manifold.

16 Claims, 6 Drawing Sheets

(56) References Cited

U.S. PATENT DOCUMENTS

| | | | |
|---|---|---|---|
| 4,593,420 A * | 6/1986 | Tobias | A61H 33/027 |
| | | | 239/428.5 |
| 4,618,426 A | 10/1986 | Mandt | |
| 4,973,432 A * | 11/1990 | Desjardins | B01F 3/04248 |
| | | | 239/416.5 |
| 5,073,310 A | 12/1991 | Ramsey | |
| 5,240,650 A | 8/1993 | Wiederhold et al. | |
| 5,298,198 A | 3/1994 | LaCrosse | |
| 6,203,701 B1 | 3/2001 | Pressley et al. | |
| 6,719,903 B1 * | 4/2004 | Pressley | B01F 3/0876 |
| | | | 210/613 |
| 7,396,453 B1 | 7/2008 | Probst | |
| 8,221,627 B2 | 7/2012 | Staton et al. | |
| 8,561,972 B2 | 10/2013 | Neville | |
| 8,795,995 B2 | 8/2014 | Hickey et al. | |
| 2006/0180546 A1 | 8/2006 | Stuth et al. | |
| 2007/0007202 A1 | 1/2007 | Stuth et al. | |
| 2015/0238910 A1 * | 8/2015 | Wu | B01F 3/0446 |
| | | | 261/76 |

\* cited by examiner

REMOVABLE NOZZLE ASSEMBLY AND GAS TRANSFER SYSTEM

CROSS-REFERENCE TO RELATED APPLICATION

This application claims the benefit of U.S. Provisional Application No. 62/192,904, filed on Jul. 15, 2015, which is hereby incorporated by reference in its entirety.

FIELD OF THE INVENTION

The present technology relates to novel apparatus for gas transfer that includes a removable ejector nozzle assembly.

BACKGROUND OF THE INVENTION

A plurality of fields and endeavors practice combining a gas stream with a liquid. Devices used for the dispersion of gas into a liquid include ejectors, venturi injectors, slot injectors, jet mixers and jet aerators and other gas liquid mixers. Such gas transfer devices have found widespread use in a variety of fields including those of wastewater treatment and fermentation.

Ejectors can move gas into a liquid with or without the aid of a fan or blower. The liquid spray coming from a nozzle in the ejector creates a pressure drop due to the Bernoulli effect. This pressure drop can be used to move gas through the ejector. Ejectors can be used to introduce an oxygen-containing gas such as air into a liquid with high gas transfer and energy efficiency, and they are typically installed at or near the bottom of a reactor (which may be a tank, basin or other natural or man-made container) containing the liquid to receive gas injection.

Ejectors are applied across a wide range of liquid treatment applications. Their primary purpose is to transfer gas to the liquid. For example, in wastewater treatment, biological reactors are provided with a combination of mixing and/or aeration devices that are used to transfer oxygen into wastewater. Ejectors are often used in these applications because they can provide independent control of oxygen transfer and mixing with the same device.

Ejectors have typically either been attached to piping systems using intermediate pipes to deliver liquid and gas from generic distribution piping to the independent ejector, or distribution piping has been fabricated integrally with ejectors, injectors or other gas transfer devices. These configurations are either bulky or do not allow for the removal of the devices for inspection, cleaning or replacement. The use of feed pipes creates additional head loss and additional opportunity for fouling. Systems with fixed gas transfer devices cannot be readily cleaned, replaced or repaired.

Schulte et al. U.S. Pat. No. 4,098,851 discloses a device for mixing gases and liquids which is said to have an intense mixing effect and be very easy to clean. The device comprises a housing with feed pipes for gas and liquid. An injector nozzle is inserted into the housing, and a mixing nozzle is screwed in the housing.

Zlokarnik et al. U.S. Pat. No. 4,162,970 discloses an injector for the dispersion of a gas into a liquid and comprising a gas inlet, a liquid inlet, and a mixing chamber communicating with said inlets and having an inlet and an outlet. The inlet of the mixing chamber is substantially round in cross-section and the outlet is substantially slit-shaped.

Zlokarnik et al. U.S. Pat. No. 4,162,971 discloses an injector for the dispersion of a gas into a liquid and comprising a gas inlet, a liquid inlet, and a mixing chamber communicating with said inlets and having an inlet and an outlet. At least one deflecting element is disposed in the mixing chamber along the axis of the liquid inlet, whereby the liquid is distributed across the full cross-section of the mixing chamber.

SUMMARY OF THE INVENTION

The present disclosure provides a gas transfer assembly having removable nozzles, suitable for a monolithic manifold system. The nozzles are not integral with the manifold system, but rather adapted for sealable attachment and facile removal when desired.

As one aspect of the present invention, a gas transfer system for mixing gas and liquid is provided. The gas transfer system for mixing gas and liquid comprises an elongated gas manifold and an elongated liquid manifold running parallel to the gas manifold. The system comprises canisters encircling the side apertures and having openings opposite the liquid manifold. One or more removable nozzle assemblies are provided in fluid connection with the side apertures, and each removable nozzle assembly comprises an inner nozzle connection assembly, an outer nozzle device, and a cap. The inner nozzle connection assembly comprises (a) an inner nozzle device having a base and a nozzle extending from the base, and the base comprises a bottom projection on one side of the ring adapted to substantially match the curved side aperture of the liquid manifold; or (b) at least one curved pipe adapter having a ring and a bottom projection on one side of the ring adapted to substantially match the curved side aperture of the liquid manifold; and an inner nozzle device having a base and a nozzle extending from the base, wherein the base contacts the curved pipe adapter and is positioned to receive liquid from the liquid manifold. The bottom projection of the inner nozzle assembly is inserted in the side aperture, optionally providing a liquid-tight fit. The outer nozzle device comprises a cylinder and a nozzle extending from the cylinder, wherein the cylinder contacts the inner nozzle device so as to receive a liquid from the inner nozzle device, and the outer nozzle device has a opening for receiving a gas into the cylinder, thereby providing space for contact between the liquid and the gas. A cap is removably attached to the canister and forms a fluid-tight connection with an outer surface of the outer nozzle device. The system also includes one or more gas passages from the gas manifold to the canister of each removable nozzle assembly which provides a closed path for gas from the gas manifold to travel to the nozzle assembly.

As another aspect of the present invention, a gas transfer assembly is provided for removable attachment to a liquid manifold. The gas transfer assembly comprises a curved pipe adapter and inner and outer nozzle devices. The curved pipe adapter provides a fluid-tight attachment to the liquid manifold on one side and a fluid-tight attachment to the inner nozzle device on an opposite side. The liquid manifold is curved convexly, and a bottom projection of the curved pipe adapter is curved concavely. The degree of curvature of the bottom projection may, but does not have to, substantially match the degree of the curvature of the liquid manifold.

Another aspect of the present invention is a treatment apparatus comprising a reactor for holding a liquid and a gas transfer system as described herein, including any of the optional elements set forth. The liquid may be a wastewater for aerobic treatment, or another liquid to be treated with a gas. The apparatus can also include a liquid outlet, optionally located at or near the bottom of the reactor, which allows wastewater to exit the reactor; a gas source connected to the gas manifold; a motive pump connected to the liquid outlet such that wastewater is withdrawn from the reactor by the motive pump; a motive pump conduit leading from the motive pump to the liquid manifold such that wastewater is pumped through the conduit into the liquid manifold and forced through the gas transfer device by force of the motive pump. The apparatus can further include a controller for automatically controlling the motive pump, the gas source or both; and a sensor in communication with the controller, wherein the sensor provides a signal to the controller to adjust the amount, flow rate or pressure of gas provided to the gas manifold.

As yet another aspect of the present invention, a method is provided for cleaning or performing maintenance on a treatment reactor. The method comprises removing a removable nozzle device(s) and cleaning or performing maintenance on the nozzle device(s).

DETAILED DESCRIPTION

The present invention uses a gas transfer system where nozzles can be removed or installed independently on the liquid manifold. The compact nature of the manifolds leads to more efficient shipping and handling. For example, the present apparatus takes less space for shipping such as in export containers or boxes and is less susceptible to damage during handling and installation and allows for more efficient application in tight space configurations. The monolithic nature of the apparatus allows for the use of lightweight, corrosion and erosion resistant, high strength materials. The combination of the elimination of the feed pipes and removability of the nozzles results in a stronger, more robust gas transfer system that is less susceptible to fouling and offers superior gas and liquid distribution with reduced installation time. The present invention allows the gas transfer assembly to be modified or upgraded based on material or process advancements.

A gas manifold is a manifold for providing gas such as nitrogen, air or other gas to a nozzle of an ejector device or other gas-liquid mixing device. A liquid manifold is a manifold for providing liquid such as wastewater or another liquid stream to an ejector device or other gas-liquid mixing device, directly or indirectly (via another conduit). A gas transfer system generally includes all the components for dispersing gas into a liquid, including gas and liquid manifolds and gas transfer devices. A gas transfer assembly generally refers to a set of nozzles and other components which, when assembled, provide a structure where gas is transferred into a liquid.

Figure 1:
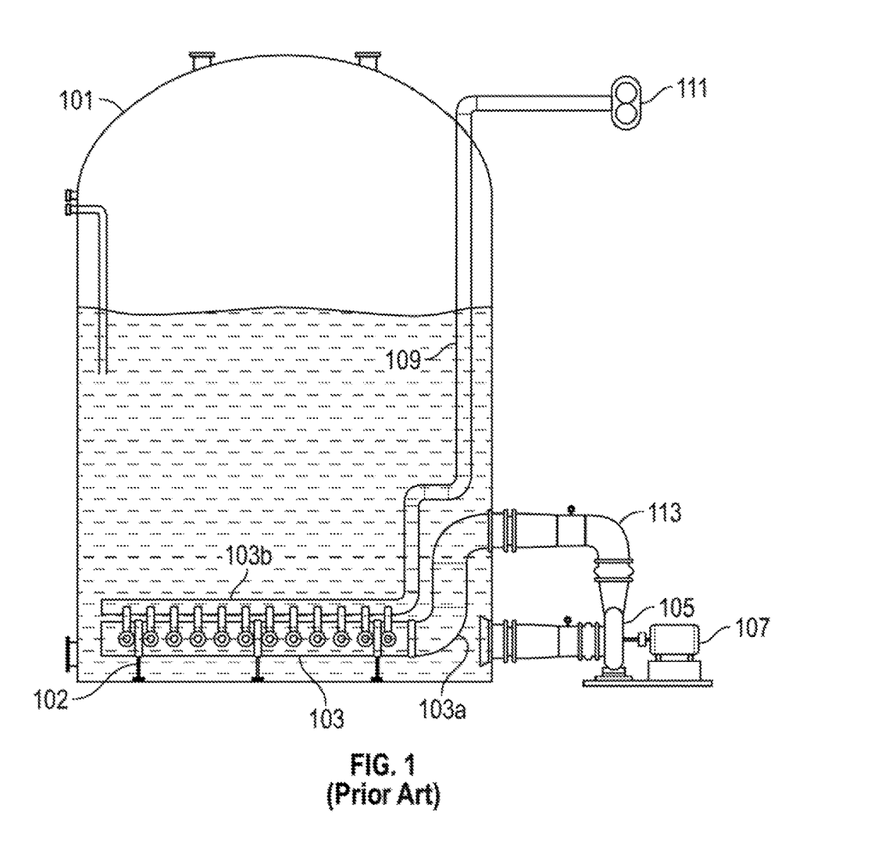
FIG. 1 shows a prior art wastewater treatment reactor containing a series of ejector devices for aeration of wastewater.

FIG. 1 shows a wastewater treatment reactor containing a series of ejector devices. Wastewater is an example of liquids that may be treated with a gas using the present apparatus and methods, and it should be understood that any reference to wastewater is intended to be a teaching regarding liquid in general, and any reference to air is intended to be a teaching regarding gas in general. FIG. 1 shows a wastewater treatment reactor 101 and associated process equipment for the treatment process. The reactor 101 contains a wastewater to be treated. The reactor contains an arrangement or unitary sequence of ejector devices (as described in more detail below and shown in cross-section in FIG. 2) extending from a liquid manifold 103a affixed to the bottom floor of the reactor via one or more supports 102. (Additional details regarding wastewater treatment reactors containing a jet aeration device and their operation can be found in U.S. Pat. No. 6,203,701.)

A motive pump 105 may be employed to circulate the wastewater through the liquid manifold 103a (shown in cross-section in FIG. 203 as liquid manifold 3). The motive pump 105 pumps the wastewater through the liquid manifold 103a. The motive pump 105 can have a variable frequency drive 107 or other means of varying the liquid flow, which may vary the force generated by the motive pump 105, thereby varying the flow rate and pressure of the wastewater through the liquid manifold 103a and through the ejector. Different amounts of energy may be needed at different phases of a treatment operation.

Air or another oxygen-containing gas is introduced from outside the reactor through a gas intake pipe 109 whose upstream end is connected to one or more air blowers 111 which blow air or another suitable oxygen-containing gas through the gas intake pipe 109. The gas intake pipe 109 transports air or gas to the gas manifold 103b (shown in FIG. 2 gas manifold 203b). The gas manifold 103b is affixed to the liquid manifold 103a.

In some embodiments, the motive pump 105 withdraws wastewater from the reactor 101, and a positive pressure liquid pipe 113 reintroduces the withdrawn wastewater into the reactor 101 (indirectly, through the gas transfer device). In other embodiments, the motive pump 105 and/or the positive pressure liquid pipe 113 pump and introduce the wastewater from another source (a different source than the solution already present in the reactor 101).

Figure 2:
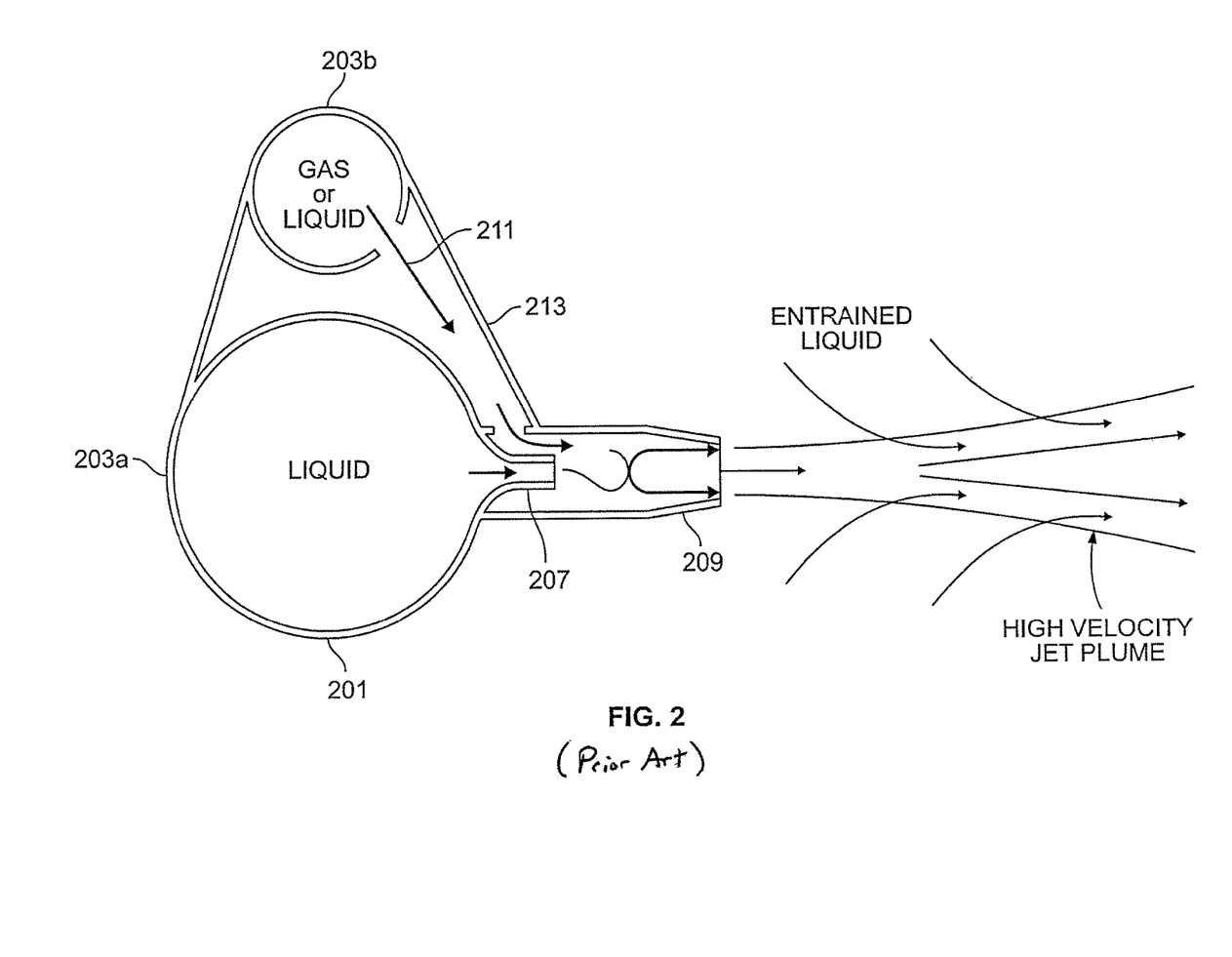
FIG. 2 is a cut-away view of a prior art ejector device adapted for aeration of wastewater.

FIG. 2 shows the interior of a prior ejector device as well as a way of fluidly connecting the air manifold to the outer nozzle. The device has a relatively small opening or inner nozzle 207 which allows the liquid to exit from the liquid manifold into an outer nozzle 209 or other conically shaped structure. The inner nozzle 207 and/or outer nozzle 209 can have a circular shape or any other desired shape, such as a flat-sided oval, square, rectangular, or another shape. The gas manifold 203b also has a gas manifold opening 211 which allows the gas to exit through a gas passage 213 into the same outer nozzle 209. The gas passage 213 connects the gas manifold 203b to the liquid manifold 203a and provides a closed path for gas from the gas manifold 203b to travel to the outer nozzle 209 and enter the outer nozzle 209. As can be seen, the inner and outer nozzles are integral with the manifolds, making their removal impossible without cutting them out of the manifold, thus making cleaning and maintenance of the nozzles and manifolds difficult.

Figure 3:
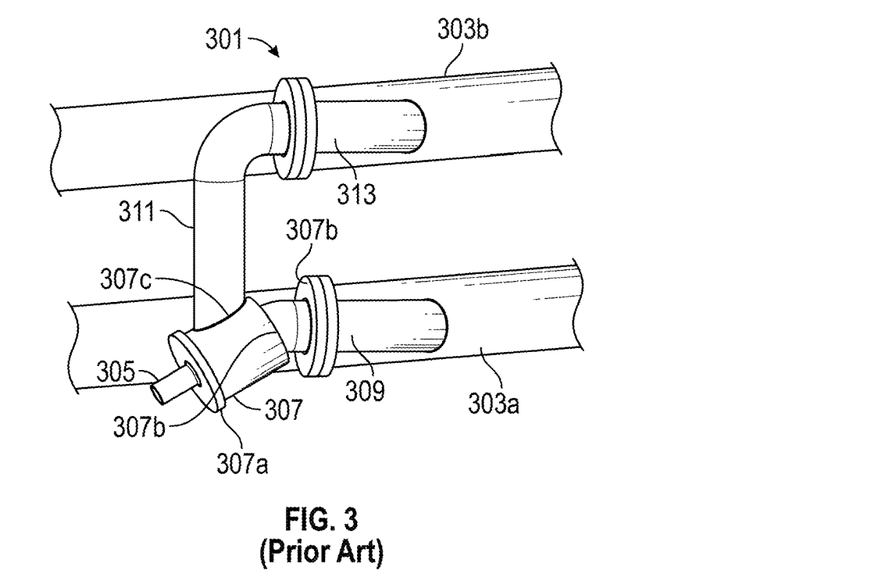
FIG. 3 shows a prior art system with an ejector and piping that fluidly connects an ejector to an air manifold and a liquid manifold using intermediate pipes.

FIG. 3 shows another prior gas transfer system 301 using an ejector device with an alternate way of fluidly connecting the air manifold to the outer nozzle. The device includes a liquid manifold 303a and a gas manifold 303b. The liquid manifold and the gas manifold may be cylindrical or another shape. The liquid manifold 303a transports a liquid such as an untreated or recycled wastewater or other liquid stream. The liquid manifold 303a and gas manifold 303b have openings on their sides, and an ejector device 305 is attached to a canister 307 at a first end. The canister is attached at a second end 307b to piping 309 that extends from an opening of the liquid manifold 303a. The canister is also attached on its side 307c to elbow piping 311 which in turn is attached to piping 313. The piping 313 is connected to the gas manifold 303b. This system includes several segments of extra piping which add to the size and expense of the aeration system. FIG. 3 is typical of systems using intermediate pipes to deliver liquid and gas from generic distribution piping to the independent ejector. These configurations are either bulky or do not allow for the removal of the ejectors for inspection, cleaning or replacement. The use of feed pipes also creates additional head loss and additional opportunity for fouling. Systems with fixed ejectors or other gas transfer devices cannot be readily cleared, replaced or repaired.

Figure 4:
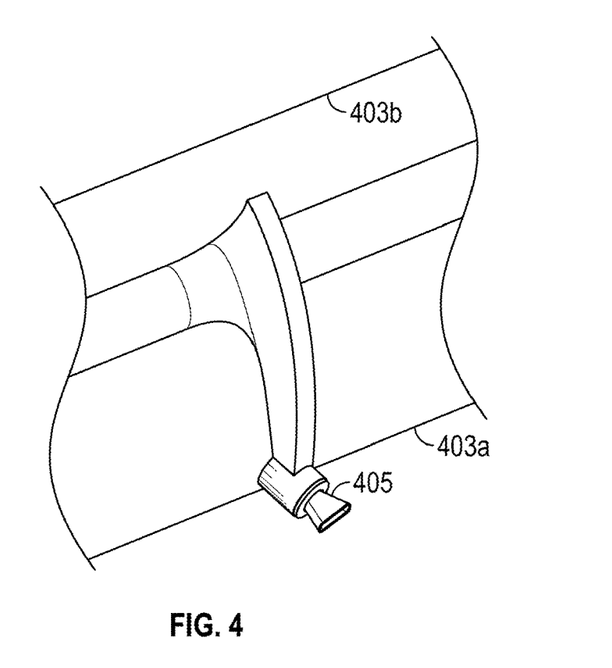
FIG. 4 shows a novel gas transfer assembly having removable nozzles for a monolithic manifold system.

FIG. 4 shows an embodiment of the novel gas transfer system for liquid treatment having a liquid manifold 403a and a gas manifold 403b. This system can have gas transfer assemblies like those shown and described in FIGS. 5 and 6. The system can be disposed in a reactor like that shown in FIG. 1, and the overall arrangement and components are like those shown in FIG. 1 with the exceptions described herein, and any other suitable modifications that may be made in light of this description. The liquid manifold 403a can be affixed to the bottom floor of the reactor via one or more supports, and the gas manifold 403b can also be affixed to the bottom floor of the reactor. In FIG. 4, the ejector 405 has a flat-sided oval (or slot) shape, and the opening is larger in the horizontal dimension than in the vertical dimension. However, the outer nozzle as well as the inner nozzle (not visible) can have any desired shape.

Figure 5:
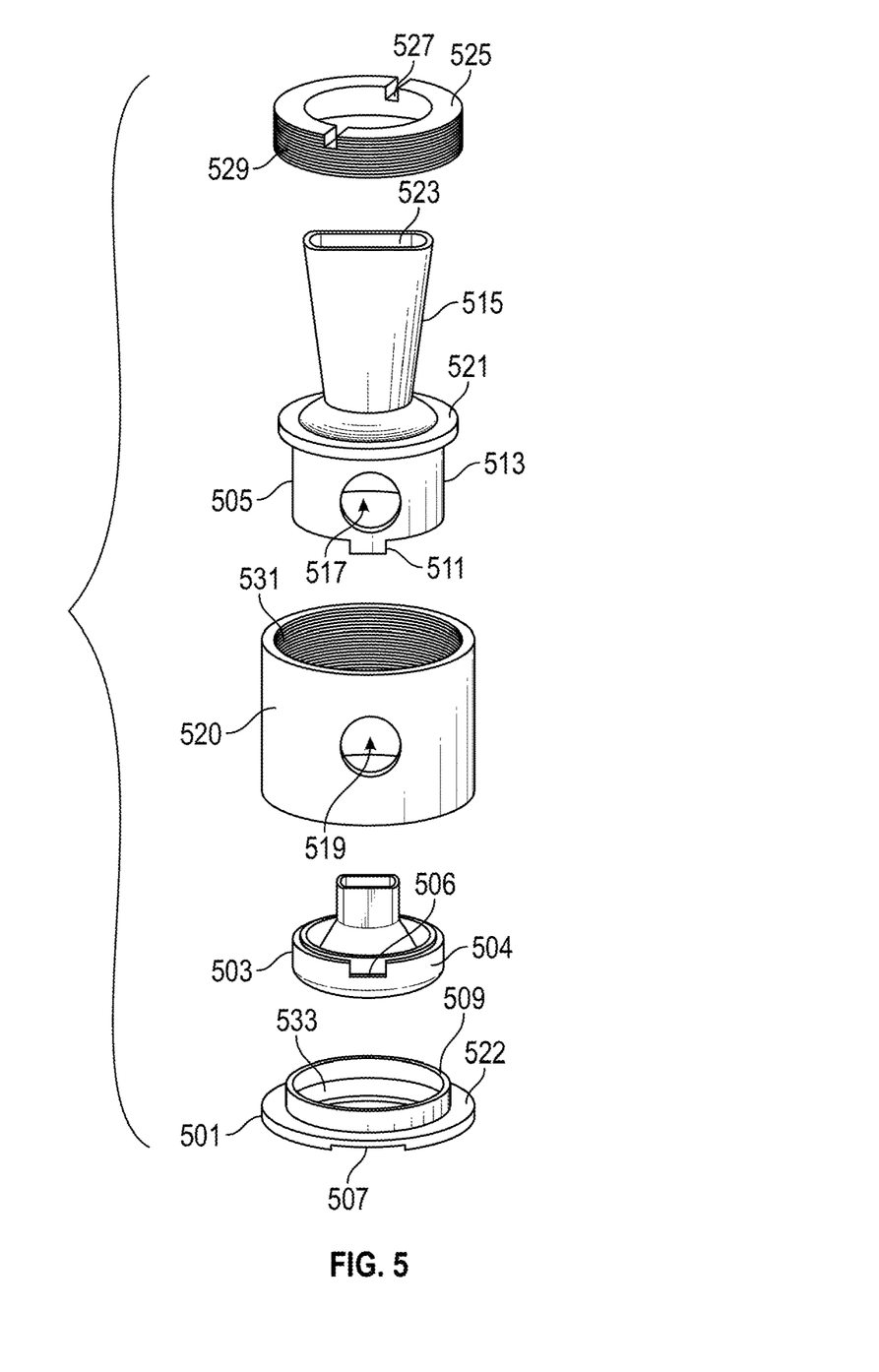
FIG. 5 is an exploded view of an embodiment of a novel gas transfer device that is removable from an aeration system.

FIG. 5 shows an exploded view of an embodiment of the present removable nozzle assembly. A curved pipe adapter 501, an inner nozzle device 503, and an outer nozzle device 505. The curved pipe adapter 501 is inserted into a side aperture of a liquid manifold. A recess 507 in the bottom surface of the ring 509 of the adapter 501 allows the adapter 501 to engage the liquid manifold wall more closely. The vertical wall 504 of the inner nozzle device 503 has a recess 506 for receiving a protrusion 511 on the outer nozzle device 505, thereby ensuring proper alignment. The outer nozzle device 505 comprises a cylinder 513 and a nozzle 515 that extends from and is integral with the cylinder 513. The cylinder 513 has one or more openings 517 in its sidewall which allows gas from an opening 519 in the canister. The top flange 521 meets the nozzle 515 which converges from its outer nozzle for opening. The opening 523 having a smaller diameter than that of the cylinder, thereby increasing pressure of the liquid-gas mixture.

A cap 525 has slots 527 to engage a screw-driver type tool for rotating the cap 525 in the canister. The cap 525 should contact the top of the outer nozzle device 521 to form a liquid-tight fit. The cap 525 has exterior threads 529 which are reciprocal to interior threads 531 in the canister 520.

The canister 520 contacts a top surface 522 of the curved pipe adapter 501; they may be fastened together by an adhesive or by reciprocal threads, such as on the exterior of the ring 509 and interior of the canister 520. The canister opening 519 is adapted to receive gas from a gas passage such the piping transporting gas from gas manifold.

In some embodiments, the curved pipe adapter 501 has an inside lip 533 upon which the inner nozzle device 503 may sit. The inside lip may be chamfered or have another configuration that is reciprocal to the bottom of the inner nozzle device 503. The inner nozzle device is separable from the adapter but has the chamfered edges to provide a liquid-tight fit. In some embodiments of the present assemblies, the curved pipe adapter and the inner nozzle device are integrally formed, or a one-piece nozzle connection assembly performs the functions of each. Such a nozzle connection assembly comprises an inner nozzle device having a base and a nozzle extending from the base, and the base comprises a ring and a bottom projection adapted for insertion in a side aperture.

Figure 6:
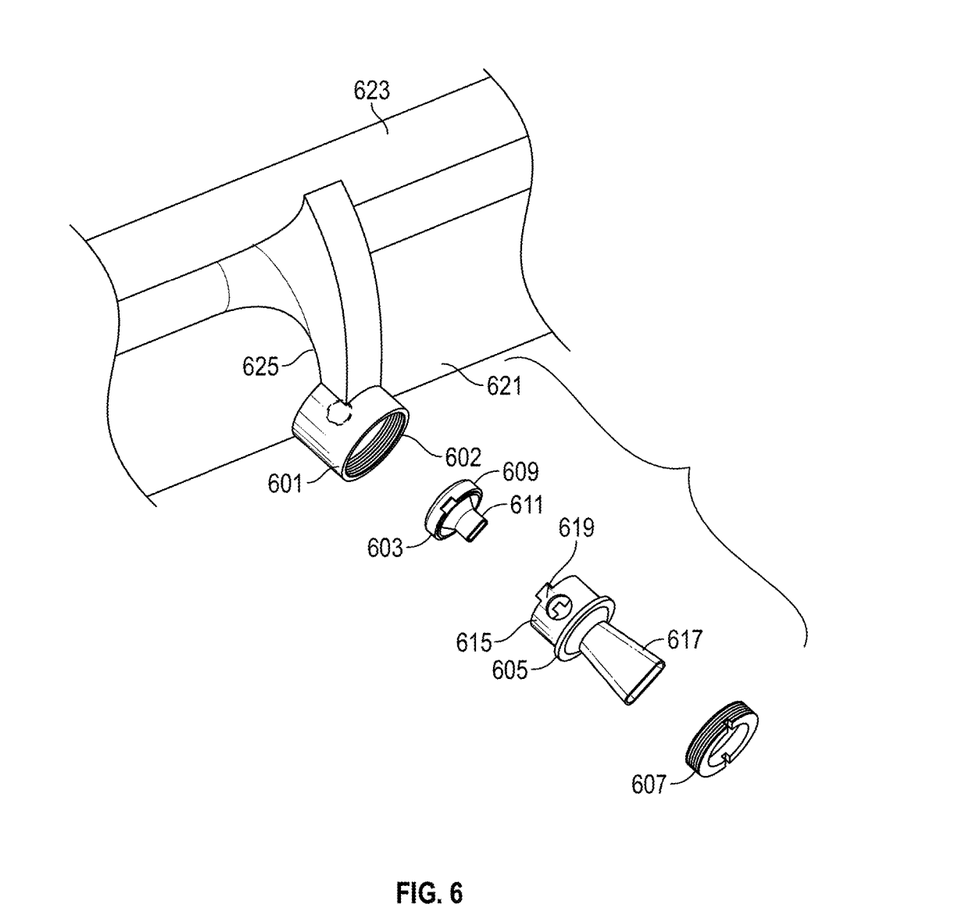
FIG. 6 shows an exploded view of an embodiment of the novel gas transfer device.

FIG. 6 shows an exploded view of the present gas transfer assembly in conjunction with a liquid manifold. The canister 601 has interior threads 602 which are reciprocal to threads on a cap 607. The inner nozzle device 603 has a concentric or circular base 609 and an oval-shaped nozzle 611 integral with and extending from the base 609. The nozzle can be any desired shape. The base 609 includes a vertical wall (see 504) which can engage the bottom of an outer nozzle device 605 at a height above the top of the vertical wall of the curved pipe adapter 613. As better shown in FIG. 5, the vertical wall 504 has a recess 506 for receiving a protrusion 511 on the outer nozzle device 605, thereby ensuring proper alignment. The outer nozzle device 605 comprises a cylinder 615 and a nozzle 617 that extends from and is integral with the cylinder 615. The cylinder 615 has one or more openings 619 in the sidewall which allows gas from an opening in the canister 601. The outer nozzle device 605 defines a location for initial contact of gas from the gas manifold and liquid from the liquid manifold via the inner nozzle. The cylinder 615 has a sidewall and a top flange 521; the top flange meets the nozzle 617 at an opening having a smaller diameter than that of the cylinder, thereby increasing pressure of the liquid-gas mixture. The liquid-gas mixture passes through the outer nozzle 617 where it undergoes vigorous mixing.

A curved pipe adapter 613 (partially hidden by the canister 601 in FIG. 6) has a flat top surface ring to make a flush contact with the flat end of the canister 601. The adapter 613 can be placed between the liquid manifold 621 and the canister 601 or it can be integral with the liquid manifold 621. In one embodiment, the canister 601 and the curved pipe adapter 613 are directly attached to the side of a liquid manifold to form a monolithic piece. The curved pipe adapter 613 also has a special configuration (shown and discussed below) adapted to fit the curved side aperture of the liquid manifold. On the ring of the adapter is a vertical wall (shown as 509 in FIG. 5) adapted to be inserted in the canister 601; in some embodiments, the exterior circumference of the vertical wall 509 is sized to provide a liquid-tight attachment and/or an attachment that is friction-based, recessed, overlaid, restricted, and/or adhesive-free (one that holds the canister 601 to the pipe adapter 613 without an adhesive and remains in place during normal operation). The canister opening is adapted to receive gas from a gas manifold 623 via a gas passage 625 inside of or formed by a structural connection between the gas and liquid manifolds.

When assembled, the inner nozzle device 603 sits on the inside lip of the curved pipe adapter 613. The outer nozzle device 603 sits on the inner nozzle device, and the threaded cap 607 holds the nozzle devices inside the canister 601. The cap 607 should contact the top of the outer nozzle device 605 to form a liquid-tight fit.

Figure 7:
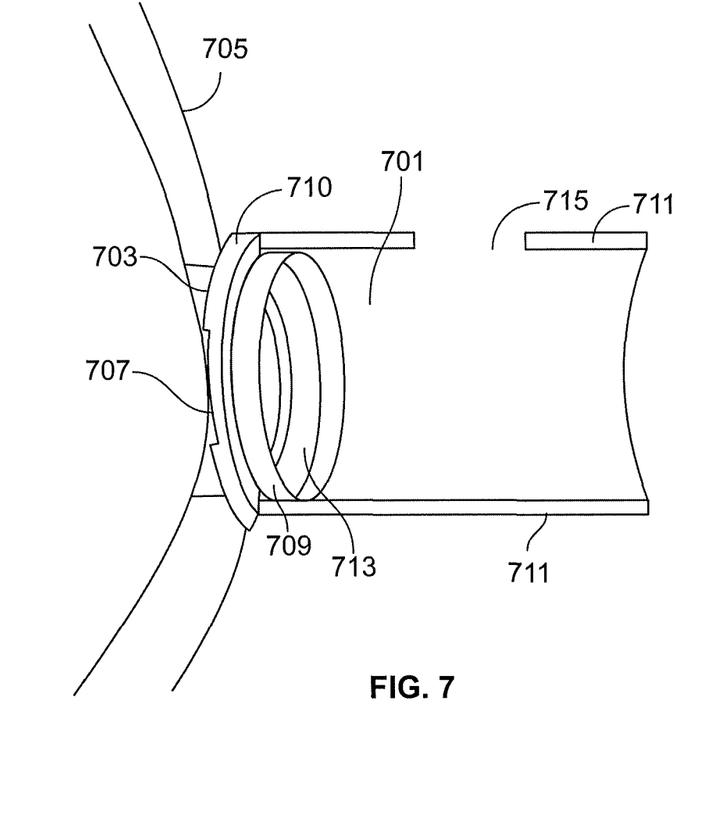
FIG. 7 shows a curved pipe adapter adapted to fit the curved side aperture of the liquid manifold.

FIG. 7 shows a curved pipe adapter 701 and its special configuration adapted to fit the curved side aperture of the liquid manifold. The adapter 701 has a bottom concentric or circular projection 703 adapted to mimic or substantially match the curved side aperture 705 of the liquid manifold. It need not have the same curvature in order to substantially match. Generally, the bottom circular projection 703 is circular with an outer diameter substantially the same as the diameter of the side aperture (generally shown by 707) of the liquid manifold wall 705, the height of the bottom circular projection 703 is substantially the same as the thickness of the wall of the liquid manifold, and/or the bottom projection 703 has a concave curve is substantially the same as the curvature of the wall of the liquid manifold. In some embodiments, the bottom projection 703 and the inner wall of the liquid manifold 705 form a liquid-tight fit and/or form a substantially even surface inside the liquid manifold, with no recesses or projections where solid material in the liquid could accumulate. In some embodiments, the bottom projection has a curvature that substantially matches the curvature of a pipe having a diameter of from about 6 inches to about 30 inches alternatively from about 8 inches to about 24 inches, alternatively from about 12 inches to about 18 inches, alternatively about 8 inches, alternatively about 10 inches, alternatively about 12 inches, alternatively about 14 inches, alternatively about 16 inches, alternatively about 18 inches, alternatively about 20 inches, alternatively about 22 inches, alternatively about 24 inches. In some embodiments, the bottom projection 703 is sized and shaped so as to fit multiple pipe diameters. For example, a bottom projection 703 having a diameter from 2 to 6 inches and/or a curvature from 3 to 10 inches is contemplated.

The curved pipe adapter 701 of FIG. 7 also includes a vertical wall 709 on the side opposite the bottom circular projection 703 and a ring 710 having a top surface. The vertical wall 709 is adapted to be inserted into a canister 711. The vertical wall 709 can have an exterior circumference adapted to provide a liquid-tight attachment and/or friction-based, adhesive-free attachment to the canister 711. The bottom of the canister contacts the top surface of the adapter 701. The curved pipe adapter 701 can also have recesses (not shown) on each side for the purposes of allowing closer contact with the outer wall of the liquid manifold and to assist in providing a perpendicular fit between the curved pipe adapter 701 and liquid manifold 705. In some embodiments, the recesses are simple rectangular cut-outs; in other embodiments, the recesses are curved to substantially match the curvature of the liquid manifold. The curved pipe adapter 701 can have a chamfered inside lip 713 configured to engage an inner nozzle device. The canister 711 has an opening 715 for receiving gas into the canister 711.

The present gas transfer assembly provides several advantages over prior devices and systems as shown in FIGS. 2 and 3. In contrast to prior art systems where the gas transfer assembly is permanently attached to the liquid manifold, in embodiments of the present invention, the gas transfer assembly is removable, making maintenance and cleaning much easier. In contrast to systems where the outer nozzle is permanently affixed to the liquid manifold or canister, embodiments of the present invention are much easier to transport, since they are essentially long pipes, even pipes 40 feet or more in length, without nozzles attached. In contrast to the system shown in FIG. 3, embodiments of the present invention do not require piping or connections to the gas and liquid manifolds and are much easier to transport and install.

Another advantage of the present apparatus is that canisters can be made from common fittings or produced as a commodity, rather than being specially designed to accommodate the inner nozzle. Alternatively, in some embodiments, the canister and/or curved pipe adapter are made from a different material than the liquid manifold. For example, stainless steel or cast iron can be used, and parts made from such materials can be welded together. Stainless steel in particular may be more durable in some non-wastewater applications, such as where steam is used for cleaning. In some embodiments, the entire gas transfer system (including the manifolds, other piping, nozzles, canisters and other components) are made from stainless steel. Another advantage is that the need for elastic seals can be reduced or eliminated due to friction, overlaid, and/or compression-fit contact between pieces and having chamfered surfaces for contacting each other. In some embodiments, the gas transfer assembly is seal-less, meaning it does not have separate structures (such as a rubber o-ring) to provide a liquid-tight seal.

All of the references cited herein, including patents, patent applications, and publications, are hereby incorporated in their entireties by reference.

In the present disclosure, wherever the word "comprising" is found, it is contemplated that the words "consisting essentially of" or "consisting of" may be used in its place.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

Although the dependent claims have single dependencies in accordance with U.S. patent practice, each of the features in any of the dependent claims can be combined with each of the features of other dependent claims or the main claim.

What we claim is:

1. A gas transfer system for mixing gas and liquid comprising:
   an elongated gas manifold;
   an elongated liquid manifold running parallel to the gas manifold, the elongated liquid manifold having one or more curved side apertures;
   a canister encircling the side aperture and having an opening opposite the liquid manifold;
   one or more removable nozzle assemblies in fluid connection with the side apertures, each removable nozzle assembly comprising:
   an inner nozzle connection assembly comprising:
   (a) an inner nozzle device having a base and a nozzle extending from the base, and the base comprises a bottom projection adapted to substantially match the curved side aperture of the liquid manifold; or
   (b) at least one curved pipe adapter having a ring and a bottom projection on one side of the ring adapted to substantially match the curved side aperture of the liquid manifold; and an inner nozzle device having a base and a nozzle extending from the base, wherein the base contacts the curved pipe adapter and is positioned to receive liquid from the liquid manifold;
   wherein the bottom projection of the inner nozzle assembly is inserted in the side aperture;

an outer nozzle device comprising a cylinder and a nozzle extending from the cylinder, wherein the cylinder contacts the inner nozzle device so as to receive a liquid from the inner nozzle device, and the outer nozzle device has an opening for receiving a gas into the cylinder, thereby providing space for contact between the liquid and the gas; and a cap removably attached to the canister and forming a fluid-tight connection with an outer surface of the outer nozzle device; and one or more gas passages from the gas manifold to the canister of each removable nozzle assembly which provides a closed path for gas from the gas manifold to travel to the nozzle assembly.

2. The gas transfer system of claim 1, wherein the inner nozzle device and the curved pipe adapter contact to form a liquid tight connection.

3. The gas transfer system of claim 1, wherein the curved pipe adapter further comprises a concentric or circular wall on an opposite side of the ring adapted to be inserted in the canister.

4. The gas transfer system of claim 3, wherein the concentric or circular wall has an exterior circumference adapted to provide a liquid-tight attachment and/or friction-based, recessed, restricted and/or adhesive-free attachment to the canister.

5. The gas transfer system of claim 1, wherein the bottom projection is circular with an outer diameter substantially the same as the diameter of the side aperture.

6. The gas transfer system of claim 1, wherein the bottom projection has a height that is substantially the same as the thickness of the wall of the liquid manifold.

7. The gas transfer system of claim 1, wherein the bottom projection has a concave curve that is substantially the same as the curvature of the wall of the liquid manifold.

8. The gas transfer system of claim 7, wherein the bottom projection and the inner wall of the liquid manifold form a liquid-tight fit and/or form an even surface inside the liquid manifold, with no recesses or projections where solid material in the liquid could accumulate.

9. The gas transfer system of claim 1, wherein the bottom projection has a curvature that substantially matches the curvature of a pipe having a diameter of from about 6 inches to about 30 inches.

10. The gas transfer system of claim 1, wherein one or more of the curved pipe adapter, the inner nozzle device, the outer nozzle device, or the canister is made from metal or plastic.

11. A treatment apparatus comprising:
a reactor for holding a liquid; and
the gas transfer system of claim 1 disposed within the reactor.

12. The apparatus of claim 11, wherein the reactor is a wastewater treatment or fermentation reactor.

13. A process for cleaning or performing maintenance on a treatment reactor having a gas transfer system; said process comprising:
(a) substantially emptying the treatment apparatus of claim 11 of any liquid within the reactor so that the removable nozzle assembly is accessible;
(b) removing the cap, the outer nozzle device, and the inner nozzle device of the removable nozzle assembly without permanently altering the gas transfer system; and
(c) cleaning or performing maintenance on one or more of the nozzles, canister, or manifold.

14. A process for transporting a monolithic manifold system for the gas transfer system of claim 1, said process comprising:
(a) providing a manifold comprising a hollow pipe having a length of at least 10 feet, wherein the pipe does not have any nozzle protruding from a side of the pipe;
(b) attaching said one or more removable nozzle assemblies to the manifold.

15. The process of claim 14, wherein the manifold does not have any nozzle attached to its side during transporting.

16. The process of claim 14, further comprising one or more of the steps of:
packaging the manifold in an export container;
stacking said manifold within a plurality of such manifolds in a transportation vehicle such as a trailer or railcar;
transporting a plurality of gas transfer assemblies for later assembly with the manifold.

* * * * *